INVENTORS:
ROBERT C. LANGLEY
HERBERT MYERS
LEONARD R. RUBIN

United States Patent Office 3,589,881
Patented June 29, 1971

3,589,881
NON-DESTRUCTIVE SEVERANCE OF
HERMETIC SEALS
Robert C. Langley, Millington, Herbert Myers, Newark, and Leonard R. Rubin, Union, N.J., assignors to Engelhard Minerals & Chemicals Corporation, Newark, N.J.
Filed June 24, 1968, Ser. No. 739,477
Int. Cl. C03b 33/00
U.S. Cl. 65—23
1 Claim

ABSTRACT OF THE DISCLOSURE

Hermetic seals comprised of a palladium-containing layer across the bonding plane of the seal can be opened non-destructively by subjecting them to hydrogen under critical conditions of palladium expansion, e.g. below about 310° C. The severed seals can be reunited by refiring.

BACKGROUND OF THE INVENTION

Ceramic and glass seals are used to unite or enclose a wide variety of devices, for example, in high vacuum or electronic equipment. Many of these devices are expensive and fragile. In many cases because numerous complicated steps are required and the components are delicate, and also because mass production techniques are employed, a certain percentage of the devices or components must be rejected. For example, in the case of large and expensive cathode ray tubes rejection may be based on improper alignment of the sealed parts, improper application of screen coatings, imperfect seals, and so on. Considerable savings can be afforded if the hermetic seals can be opened without damaging the components. Indeed, one of the principal criteria used to evaluate a seal for use in cathode ray tubes is the feasibility of severing the seal without damaging the components. Moreover, a non-destructive means for severing seals would also permit examination of and replacement of parts in devices which have failed in use as well as those rejected on production.

Heretofore satisfactory non-destructive methods for severing ceramic and glass seals have not been found. Conventional ceramic and glass sealing is often effected by direct fusion welding between the members to be bonded. This type of seal forms a permanent bond between the members which cannot readily be severed in a non-destructive manner. Generally these seals are opened by sawing along the sealed line. In some instances mechanical or thermal shock may be utilized. Another sealing technique that has been used, especially where intensive heat is undesirable and ceramic parts must be bonded, involves the use of a glass sealant which has a melting or softening point below that of the parts being joined and which also has a thermal coefficient and other sealing properties compatible with the joined parts. Lead borate type sealing glasses, for example, have been used for this purpose. The sealing glass may be subsequently hardened by devitrification. The soft sealing glass can be softened in heating and pulled apart. However, these seals have inherent thermal limitations. When the soft glass is hardened by devitrification, the more conventional sawing or fracturing methods must be used. In addition, to place the separated members in condition for subsequent resealing, clean sealing surfaces are mandatory and it is usually essential to completely remove all traces of the initial sealing glass and then apply fresh sealing glass. This removal of the intermediate glass is a major problem in the sealing process and many techniques have been suggested for handling it, such as noted in U.S. Pat. 2,852,352. All the methods are costly and troublesome— and in addition sawing and fracture techniques for severing the bonded parts must be utilized beforehand.

INVENTION

In accordance with this invention a mechanically strong hermetic seal is provided which can be severed simply and non-destructively. The severed parts can be resealed by a simple and inexpensive procedure.

The seal is comprised of a palladium-containing layer across the entire plane of the seal between the faying surfaces of the bonded members, and such palladium-containing layer is exposable to hydrogen.

The term "exposable to hydrogen" means that the layer can be contacted with hydrogen. For example, if the peripheral edge of the palladium-containing seal is exposed to the atmosphere, the entire layer can be contacted with hydrogen. It is a well known unique property of palladium, and a great many palladium based alloys, to absorb large quantities of hydrogen. Merely by contacting the palladium layer with hydrogen at an exposed point or edge of the palladium-containing layer, the hydrogen will reach the entire layer by diffusion through the metal.

In one embodiment of this invention the paladium-containing layer is immediately adjacent to the bonded members. In another embodiment the palladium-containing layer is separated from the bonded members on one or both surfaces by a fused inorganic non-metallic sealant interlayer. In still another embodiment a metal body is incorporated in a fused inorganic non-metallic sealant interlayer. Preferably, where ruggedness is essential the seal consists of a palladium-containing layer and a fused inorganic non-metallic layer across essentially the entire plane of the seal.

The palladium-containing layer consists of essentially all palladium or a palladium based alloy, which undergoes expansion characteristics in hydrogen similar to palladium, or alternatively it consists of a palladium or palladium alloy powder dispersed in a fused inorganic non-metallic sealant. With respect to the alloys, many palladium alloys are known to have similar expansion characteristics in hydrogen as palladium, e.g. alloys of Pd-Cu, Pd-Pt, Pd-Rh, Pd-Ir, Pd-Os. Certain alloys, e.g. Pd-Ag, have the same expansion characteristics in hydrogen as palladium, but only within certain composition ranges. With respect to the palladium-inorganic sealant modification, the palladium is present in a sufficient concentration so that a substantial amount of the palladium can be reached by diffusing hydrogen when, in order to sever the seal, the layer is contacted, for example at the peripheral edge, with hydrogen. Generally the palladium forms a continuous path through the fused inorganic non-metallic layer. Electrical conductivity of the palladium-containing layer is a rough test of whether sufficient palladium is present. Typically the palladium-fused sealant layer contains at least 50% palladium, by weight, and preferably it contains 90% or more palladium.

The palladiu-containing layer is deposited across essentially the entire plane of the seal by any conventional means to form an adherent layer on the substrate. When deposited as a palladium-fused sealant layer, one suitable method is to apply a mixture of palladium powder and inorganic glass or ceramic sealing powder to a substrate and then to fire the deposit at a temperature which would effect an adherent coating on the substrate. The effective temperatures depend on the sealant and substrate. For example, with a low melting glass powder as the sealant, a temperature of about 600° C. is suitable, while ceramic-containing sealants require higher temperature, e.g. 1000° C.

The thickness of the palladium-containing layer is not critical. It depends on many factors, e.g. the composition and thickness of the materials to be bonded, the ultimate use of the sealed article, the presence of one or more of the fused inorganic non-metallic sealant layers and so on. Exceedingly thin palladium-containing films have been found suitable. Typically such layers range in thickness from about 0.0001 to 0.001 inch. The thickness may exceed 0.001 inch, but this is usually considered unnecessary.

The fused inorganic non-metallic sealant layer refers to a layer developed from ceramic and glass sealing powders. Sealing glazes, glasses, solder glasses, ceramics, fritted and non-fritted, and mixtures thereof are used. Usually sealing glasses are mixtures of metal oxides, however, for extremely high temperature applications other refractory compounds can be used. Any of the conventional sealing ceramics or glasses may be used. The selection of the sealant is well within the skill of the art. The sealant is matched to the substrate, for example, with regard to thermal coefficients of expansion and compataibility of materials. Thermal and chemical stability of the sealant and the ultimate use of the sealed body are also important considerations. Generally the sealant chosen will have thermal coefficients of expansion within ±10% of the parts joined, and preferably will match even closer. Also, the sealant must have a softening point below the parts to be sealed. Exemplary of some sealing powders with low thermal coefficients of expansion that have been found suitable are those having the nominal compositions set forth in the following table.

TABLE

| Ingredients as oxides | Parts by weight of— | | |
|---|---|---|---|
| | Powder "A" (1) | Powder "B" (2) | Powder "C" (3) |
| $Al_2O_3$ | 13.6 | 5.5 | 15.7 |
| $SiO_2$ | 44.9 | 70.6 | 51.3 |
| $B_2O_3$ | 35.4 | 45.1 | 29.0 |
| $K_2O$ | 3.5 | 19.3 | 7.5 |
| $Na_2O$ | 2.7 | 1.4 | 4.0 |
| $CaO$ | 9.5 | 0.4 | 36.4 |
| $SrO$ | 17.7 | 0.7 | 43.8 |
| Total | 127.3 | 143.0 | 187.7 |

The use as sealant of lead borate glasses which may be subjected to devitrification are also within the purview of this invention. By lead borate glass is meant glasses in which the principal glass-forming-oxide is $B_2O_3$ and the principal modifying oxide is PbO. Additional glass-forming materials may also be present such as alkali and alkaline earth metal oxides, ZnO, $Al_2O_3$ and $SiO_2$.

The foregoing examples have been directed to the use of a glass powder as the sealant, but as indicated above the sealant need not be so limited. It may, in certain cases, be desirable to admix with the glass powder a finely-divided ceramic of the same composition as the ceramic element bonded in the assembly. For example, the sealant may comprise a mixture of glass and ceramic powder containing from 10 to 75% ceramic powder. The addition of ceramic powder to the glass powder serves to increase the temperature at which the seal can be used and forms a stronger bond with the ceramic substrate.

Additionally, finely divided metal powders can be added to the powdered glass sealant. For example, finely-divided silver or copper powder or a dilute solution of Ag or Cu compounds in an amount of 1 part to 10,000 of glass first may be added to provide nucleation sites in the glass after fusion. These sites promote crystal growth when the glass is maintained at an elevated temperature for a period of time. When significant crystallization has occurred the softening temperature of the crystallized material is raised significantly, e.g. 150° to 300° C., and the upper temperature at which the seal can operate is raised accordingly. Also, a finely divided refractory material such as zirconium diboride can be present in an oxide sealing layer. Such additives also serve to increase the temperature at which the seal can operate.

Henceforth, for convenience, the fused inorganic non-metallic sealant when present as a separate layer or when incorporated in the palladium-containing layer shall be referred to herein as a fused metal oxide sealant. The ceramic and glass sealing powders from which the fused sealants are developed shall be referred to as the sealant powders or metal oxide sealant powders. However, no inference should be drawn that the sealant or the powders from which the sealant is developed must be restricted to oxides, since for example as noted above metal powders can be incorporated as nucleating agents and compounds other than oxides may be used in certain circumstances.

The fused metal oxide sealant layer, when present, is usually thicker than the palladium-containing layer, and is generally about 0.0002 to 0.020 inch thick, and typically about 0.001 to 0.010 inch thick after firing. The thickness of the layer will depend primarily on the smoothness of the bonding surface; the smoother the surface, the lower the required thickness of the fused sealant layer.

The fused metal oxide sealant layer is applied by conventional techniques to the bonding surface of an element to be sealed. For example, the bonding surface of a body is coated with an aqueous slurry of a glass frit and dried, and then the coated body is assembled with an element which has deposited across its bonding surface a palladium-containing layer, and thereafter the assembly is fired at a temperature and for a duration of time dictated by the sealant powder.

The sequence of firing is not critical. In the method of forming the seal given above, the entire assembly is fired in one step, i.e. the two bonding layers are not fired individually, but the layers are deposited and then after assembly the unit is fired. Alternatively, one or more of the bonding layers may be fired individually and then the seal may be assembled and fired.

With regard to the palladium-containing layer, it should be noted that by incorporating a sealant powder in the layer, this layer can be matched in thermal expansion and bonded more readily to the members to be bonded and also to the fused metal oxide sealant layer. The sealant powder in the palladium-containing layer and in the fused metal oxide sealant layer need not be the same.

The seals of this invention are used to bond ceramic to ceramic, glass to glass, glass to ceramic, glass to metal, and ceramic to metal. As noted above, metal bodies may be present in or bonded to the ceramic or glass components. However, the palladium-containing layer is not disposed adjacent to the metal body since at the firing temperatures the palladium may diffuse into the metal. If a metal body is present, a fused metal oxide layer is disposed between such metal body and the palladium-containing layer. An aditional caution is that body should not be palladium or a palladium alloy since it will be distorted if it is contacted with hydrogen on severance of the seal.

As indicated above, selection of the sealant powders will be dictated by such considerations as the composition of the elements bonded and the conditions under which the seal is ultimately to be used. The seals can be high temperature seals since the severance of the seal does not depend on the softening temperature of the sealant.

The above described seals all have a palladium interface across essentially the entire plane of the seal. This interface is formed between the palladium-containing layer and the ceramic or glass member or the fused metal oxide layer. It is at the interface that the seal is severed on contact of the palladium-containing layer with hydrogen under conditions which cause the palladium to expand, thereby setting up stresses in the layer which cause the seal to separate.

It is believed that the severance of the seal occurs as a result of the expansion of palladium in changing to the beta-phase on contact with hydrogen below the critical temperature. The critical temperature is that temperature above which the beta-phase volume change does not occur. For pure palladium this temperature is about 310° C. The amount of hydrogen absorbed by Pd decreases with increasing temperature, but the rate of absorption increases with increasing temperature and temperatures and hydrogen pressure should be so chosen that sufficient stress is raised in the palladium layer to sever the seal in a reasonable amount of time. The conditions under which palladium expands on contact with hydrogen are well known. Palladium-hydrogen systems relating the transition of palladium from the alpha to beta phase at various pressures and temperatures and ratios of H/Pd have been explored in detail and illustrated in phase diagrams. Suitable temperature ranges and hydrogen pressure are known to be modified by alloying of the palladium. U.S. 3,238,700 indicates, for example, the critical temperature for a Pd-4.5 Ru alloy is about 200° C. The choice of temperature and hydrogen pressure is well within the skill of the art. Generally the contact temperature is below 310° C., and preferably it is at room temperature.

To sever the seal, conveniently, the seal is contacted with a hydrogen-containing gas. For example, the seal may be subjected to an atmosphere of tank hydrogen or hydrogen in an inert gas such as annealing gas (7% $H_2$-93% $N_2$). Still another method is to subject the seal to a medium capable of producing hydrogen. Preferably however, the seal is contacted with a hydrogen-containing gas.

It has been found that the severed members can be resealed in several ways, for example, by first refiring the palladium-containing layer and then refiring the assembly, or by refiring the assembly in a single step, or by reprocessing the separate members as they were originally done. In refiring the palladium is changed back to the alpha-phase.

The invention is further illustrated in the drawings in connection with its use as a seal in a cathode ray tube.

Figure 1:
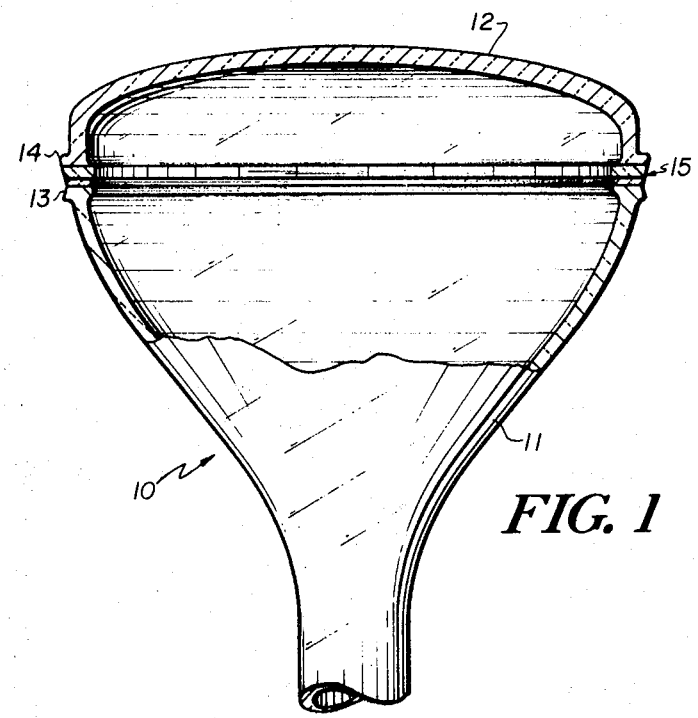
FIG. 1 is an elevational view, partly in section, of a sealed cathode ray tube to be salvaged.

In FIG. 1, the tube envelope, generally designated by numeral 10, is composed of a funnel section 11 and a panel section 12 integrally united around the opposed peripheral edges 13 and 14 of funnel 11 and panel 12, respectively, by seal 15 to produce composite tube envelope 10.

Figure 2:
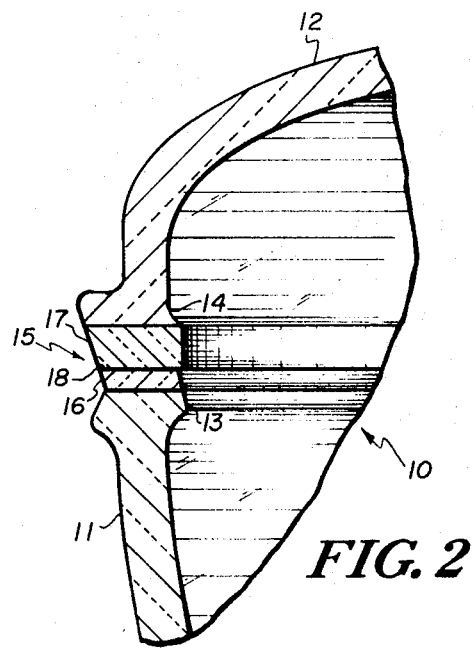
FIG. 2 is an exploded cross-sectional view of a fragmentary portion of the sealing area, showing the layers in the seal.

FIG. 2, an exploded cross-sectional view of a sealed fragmentary section of the tube, shows the composite layers of seal 15. Layer 16 is a palladium-containing layer consisting of, for example, 91% by weight Pd and the balance a lead borate glass. Layer 17, which is thicker than the palladium-containing layer 16, is a fused lead-borate glass. Layers 16 and 17 are bonded at interface 18. The seal 15, is prepared, for example, in accordance with Example 4 below.

After being subjected to hydrogen at atmospheric pressure at room temperature for 10 minutes, the funnel and panel section separate non-destructively, primarily along the interface 18 between the two layers 16 and 17.

EXAMPLE 1

To illustrate the seal of the present invention two nepheline syenite containing ceramic elements were bonded, severed and resealed.

Sealing of the ceramic elements was achieved by first applying to the bonding surface of one of the ceramic elements an aqueous slurry containing a palladium-fused metal oxide sealant composition containing 91% palladium and the balance, a commercial sealing power having the following nominal composition:

| Oxide: | Parts by weight |
|---|---|
| $Al_2O_3$ | 13.6 |
| $SiO_2$ | 44.9 |
| $B_2O_3$ | 35.4 |
| $K_2O$ | 3.5 |
| $Na_2O$ | 2.7 |
| CaO | 9.5 |
| SrO | 17.7 |

The palladium metal oxide mixture was applied by brushing to provide a layer of about 0.001 inch thick after firing to 1000° C. The coated ceramic element was then fired. Next, the above-mentioned commercial powder was applied in the requisite thickness from an aqueous slurry, prepared by ball milling the powder in water, to the bonding surface of another ceramic element. The elements were placed in bonding relationship and the assembly was fired to 1000° C. The resultant seal was hermetic, mechanically strong and capable of being employed under elevated temperature and pressure conditions.

The seal was simply severed at the palladium interface by exposing the assembly at room temperature to hydrogen at a pressure of 5 p.s.i.g.

The severed ceramic elements were resealed very simply. First, the element having the palladium-fused metal oxide sealant layer was fired to 1000° C. Then, it was placed in a bonding relation with the ceramic element having the fused metal oxide sealant layer and fired to 1000° C. The resultant seal possessed the same excellent characteristics of the seal made with unused components.

Seals made in this manner have been operated at 500° C. and 450 p.s.i.g. differential pressure for extended periods of time.

EXAMPLE 2

This example illustrates that alternative firing sequences may be used.

Two nepheline syenite ceramic elements were bonded using the same bonding compositions as given in Example 1. The same general method of forming the seal as given in Example 1 was used except that after the sealant powder coating was applied in the requisite thickness to one of the elements, it was fired at a temperature of 1000° C. for 30 minutes to form a fused metal oxide layer. Next the palladium-sealant powder layer was applied to the surface of the other ceramic element; the coated surfaces of the two elements were then placed in bonding relationship and the assembly was fired at 1000° C. for 30 minutes to provide a mechanically strong seal capable of being employed under conditions of elevated pressure and temperature.

The seal was severed at the interface of the two layers by exposing the assembly at room temperature to hydrogen at a pressure of 5 p.s.i.g.

EXAMPLE 3

This example illustrates the applicability of other sealant powder compositions to the seal of this invention.

On the bonding surface of one nepheline syenite containing ceramic element was applied a palladium-fused metal oxide sealant layer in accordance with Example 1. Next, a sealant powder comprising 50 wt. percent Pyroceram No. 45 (a product of Corning Glass Works) 12.5 wt. percent Georgia kaolin, 7.5 wt. percent Tennessee ball clay, 2.5 wt. percent silica and 27.5 wt. percent nepheline syenite was applied in a thickness of 10 mils to the bonding surface of the other ceramic element. The elements were placed in a bonding relationship and the assembly was fired to 1000° C. The resulting seal was hermetic, mechanically strong and capable of being used at elevated temperatures and pressures.

The seal was simply severed in accordance with the preceding examples.

EXAMPLE 4

This example illustrates the method of sealing and severing two soda lime glass elements by this invention.

A sealant powder consisting of a 2:1 mixture by weight of lead borate and bismuth subnitrate was employed. The palladium-sealant powder composition consisted of 91 wt. percent Pd powder, the balance being the 2:1 mixture of lead borate and bismuth subnitrate.

An aqueous slurry of the palladium-sealant powder composition was applied by brushing to give a fired thickness of approximately 0.0005 inch to the bonding surface of one glass element and allowed to air dry at ambient temperature. (Optionally, the palladium layer can be fired at 600° C.) Next the sealant powder was applied as an aqueous slurry, by brushing to the bonding surface of the other glass element. The elements were placed in bonding relationship and the assembly was fired to 600° C. A mechanically strong seal was obtained.

The seal was severed at the palladium interface by exposing the assembly at room temperature to hydrogen at a pressure of 10 p.s.i.g.

It will be appreciated that various applications and alternatives in procedure other than those given in detail above will occur to those skilled in the art, without departing from the inventive concept.

What is claimed is:

1. A method of non-destructively severing a seal for bonding members of the same or different materials including ceramics and glass, said seal comprising a palladium-containing layer across essentially the entire bonding plane between the members, and said palladium layer, being exposable to hydrogen, which comprises contacting such seal with a hydrogen-containing gas at a temperature between about room temperature and 310° C., but below the temperature at which the beta-phase volume change will not occur, for a sufficient time to cause the transformation in the palladium-containing layer from the alpha to the beta phase, thereby causing the seal to sever.

References Cited
UNITED STATES PATENTS

| | | | |
|---|---|---|---|
| 2,800,710 | 7/1957 | Dunn | 29—473.1 |
| 3,011,673 | 12/1961 | Van Zee | 65—23X |
| 3,442,006 | 5/1969 | Guichet et al. | 29—473.1X |

ARTHUR D. KELLOGG, Primary Examiner

U.S. Cl. X.R.

65—43, 58; 29—472.7, 426, 473.1; 220—2.1